(No Model.) 2 Sheets—Sheet 1.
R. S. BUCH & J. BELSER.
MILK HEATING VAT.
No. 573,389. Patented Dec. 15, 1896.
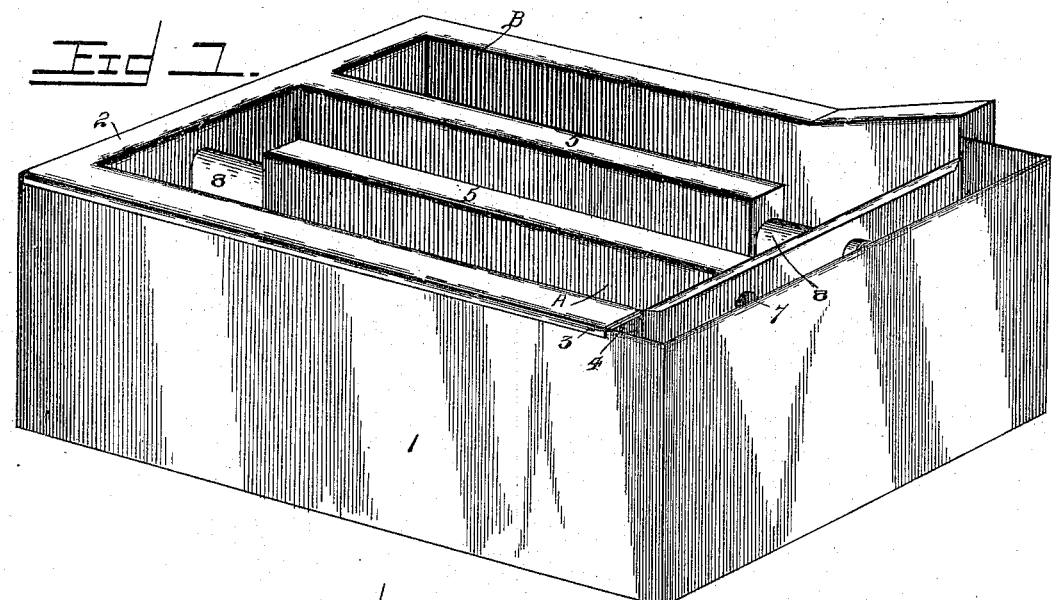
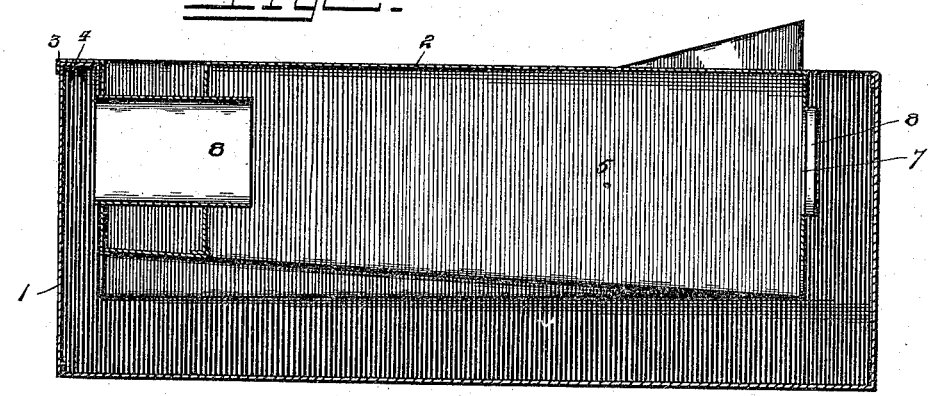
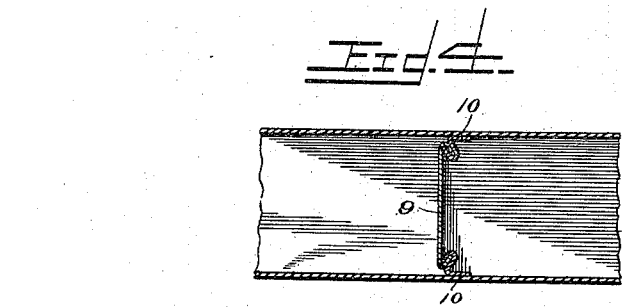
Witnesses
W. J. LaVarre
Inventors
Royer S. Buch
Julius Belser
By their Attorneys, (No Model.)  2 Sheets—Sheet 2.
R. S. BUCH & J. BELSER.
MILK HEATING VAT.

No. 573,389. Patented Dec. 15, 1896.

Witnesses

Inventors
Royer S. Buch.
Julius Belser.
By their Attorneys,

UNITED STATES PATENT OFFICE.

ROYER S. BUCH AND JULIUS BELSER, OF ELIZABETHTOWN, PENNSYLVANIA.

MILK-HEATING VAT.

SPECIFICATION forming part of Letters Patent No. 573,389, dated December 15, 1896.

Application filed April 29, 1896. Serial No. 589,571. (No model.)

*To all whom it may concern:*

Be it known that we, ROYER S. BUCH and JULIUS BELSER, citizens of the United States, residing at Elizabethtown, in the county of Lancaster and State of Pennsylvania, have invented a new and useful Milk-Heating Vat, of which the following is a specification.

Our invention relates to milk-heating vats, and has for its object to provide a simple and efficient construction and arrangement of parts whereby a complete circulation of heated water and steam or equivalent agents is insured around the various chambers of the milk-channels.

Further objects and advantages of this invention will appear in the following description, and the novel features thereof will be particularly pointed out in the appended claims.

Figure 5:
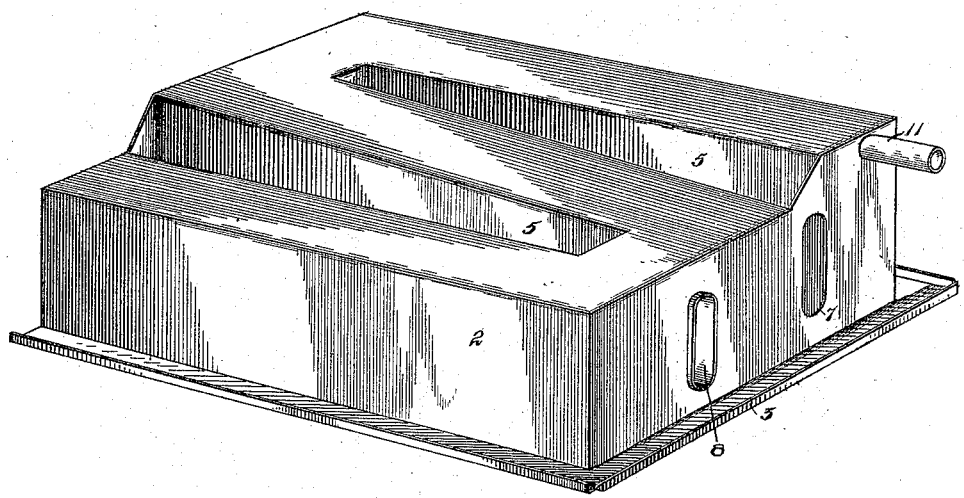
Figure 3:
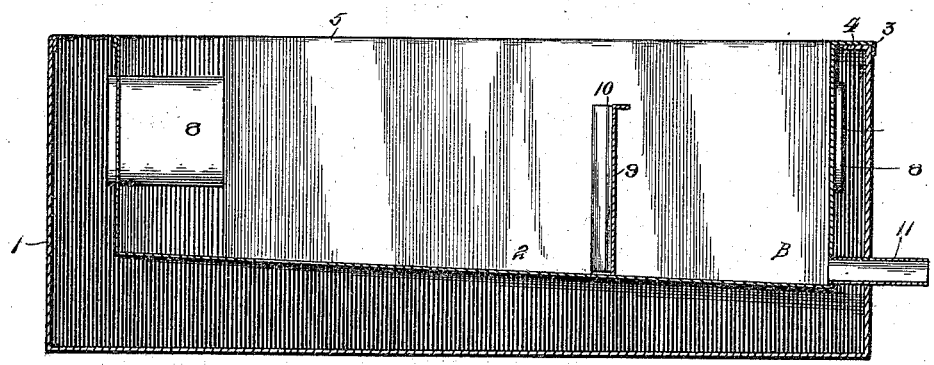

In the drawings, Figure 1 is a perspective view of a milk-heating vat constructed in accordance with our invention. Fig. 2 is a longitudinal section taken through one of the hollow walls between contiguous branches of the milk-channel. Fig. 3 is a partial longitudinal section through the outlet-branch of the milk-channel. Fig. 4 is a detail horizontal section of the gate and contiguous parts of the walls of the milk-channel. Fig. 5 is a perspective view, inverted, of the tray containing the milk-channel.

Similar numerals of reference indicate corresponding parts in all the figures of the drawings.

1 designates an exterior casing adapted to contain a heating agent, such as hot water, steam, or their equivalent, and within the casing is fitted a tray 2, provided with lateral flanges 3 to rest upon inturned flanges 4 at the top of the casing, said lateral flanges 3 terminating in downturned lips to bear against the outer surfaces of the sides of the casing. The interior of the tray is divided, by means of hollow walls 5, into compartments connected in series to form a milk-channel, the floors of said milk-channel being inclined to cause the milk to flow from the inlet end A of the channel to the outlet end B thereof. The hollow walls, which are open at their lower sides to establish communication with the interior of the casing, each extend from one end of the wall of the tray to a point contiguous to the opposite end of the wall, and an opening 7 is formed in each end wall of the tray in communication with the contiguous end of the hollow intermediate wall.

Arranged in communication with the opposite end of each hollow wall and spanning the interval between the same and the contiguous end wall of the tray is a conductor 8, which thus establishes communication between the interior of the hollow wall and the interior casing without closing the passage or otherwise interfering with the flow of milk through the channel. Said conductor, by reason of containing the heating agent in common with the hollow wall, also serves to raise the temperature of the milk as it comes in contact therewith.

Located in the terminal or outlet-branch of the milk-channel contiguous to the outlet end B is an adjustable gate 9, preferably mounted to slide vertically in guides 10 on contiguous surfaces of the walls of the channel and adapted to be normally arranged in its depressed position to cause the milk to flow thereover. Said gate may be elevated, after the supply of milk has ceased, to allow the channel to drain. The heated milk escapes from the outlet end of the channel through a discharge-pipe 11, which projects through an opening in the end wall of the casing.

The operation of this device is similar to that of other devices heretofore employed for the purpose of heating milk, and it will be understood from the foregoing description that a complete circulation of the heating agent is established through each of the hollow intermediate walls of the milk-receptacle, and hence that the surfaces of the walls in contact with the milk are uniformly heated to insure thorough heating of the contents of the channel.

Various changes in the form, proportion, and the minor details of construction may be resorted to without departing from the spirit or sacrificing any of the advantages of this invention.

Having described our invention, what we claim is—

1. A milk-heating device having a receptacle for a heating agent, and a tray arranged within said receptacle and provided with a continuous milk-channel formed by alternately-arranged hollow walls, the interior of each hollow wall being in communication at both ends with the interior of the receptacle to allow a free circulation of the heating agent, substantially as specified.

2. A milk-heating device having a casing adapted to contain a heating agent, a tray fitting in the casing and forming a milk-receptacle, the interior of said tray being divided by parallel hollow walls starting alternately from opposite end walls of the tray to form a continuous milk-channel of which the floor declines from the inlet to the outlet end, and openings being formed in the walls of the tray to establish communication between the contiguous end of each hollow wall and the interior of the casing, and a conductor connecting the other end of each hollow wall with the interior of the casing and spanning the channel, whereby each wall is open at both ends to establish a circulation, substantially as specified.

3. In a device of the class described, the combination of an exterior casing, a tray arranged within the casing and provided with a continuous milk-channel formed by interposed hollow walls, each hollow wall being open at both ends for communication with the interior of the casing, and a single gate, of less height than the depth of the channel, adjustably mounted for vertical movement in the channel contiguous to its outlet end and adapted to be normally arranged in a depressed position with its upper edge below the upper edges of the hollow walls to allow the passage of milk thereover, substantially as specified.

In testimony that we claim the foregoing as our own we have hereto affixed our signatures in the presence of two witnesses.

ROYER S. BUCH.
JULIUS BELSER.

Witnesses:
I. N. S. WILL,
WM. H. BARNES.